United States Patent
Mehta et al.

(10) Patent No.: US 12,464,506 B2
(45) Date of Patent: Nov. 4, 2025

(54) SYSTEMS AND METHODS FOR VIRTUAL BANDWIDTH PARTS

(71) Applicant: DISH WIRELESS L.L.C., Englewood, CO (US)

(72) Inventors: Dhaval Mehta, Aldie, VA (US); Amit Pathania, Herndon, VA (US)

(73) Assignee: DISH WIRELESS L.L.C, Englewood, CO (US)

( * ) Notice: Subject to any disclaimer, the term of this patent is extended or adjusted under 35 U.S.C. 154(b) by 491 days.

(21) Appl. No.: 17/962,993

(22) Filed: Oct. 10, 2022

(65) Prior Publication Data

US 2023/0144911 A1    May 11, 2023

Related U.S. Application Data

(60) Provisional application No. 63/276,458, filed on Nov. 5, 2021.

(51) Int. Cl.
*H04W 72/0453* (2023.01)

(52) U.S. Cl.
CPC .............................. *H04W 72/0453* (2013.01)

(58) Field of Classification Search
CPC .............................................. H04W 72/0453
See application file for complete search history.

(56) References Cited

U.S. PATENT DOCUMENTS

| | | | |
|---|---|---|---|
| 2019/0132109 A1 | 5/2019 | Zhou et al. | |
| 2021/0112552 A1 | 4/2021 | Tiirola et al. | |
| 2021/0127359 A1* | 4/2021 | Takeda | H04L 5/001 |
| 2021/0226842 A1* | 7/2021 | Kim | H04L 5/0092 |
| 2023/0072549 A1* | 3/2023 | Dai | H04L 5/0092 |

OTHER PUBLICATIONS

Qualcomm Incorporate et al: "BW Reduction for Redcap UE", 3Gpp Draft RI-2110193, 3Rd Generation Partnership Project (3GPP), Mobile Competence Center 650, Route Des Lucioles F-06921 Sophia-Antipolis Cedex France, vol. RAN WGI, No. e-Meeting; Oct. 11, 2021-Oct. 19, 2021, Oct. 2, 2021.

(Continued)

*Primary Examiner* — Kevin C. Harper
(74) *Attorney, Agent, or Firm* — Jeremiah J. Baunach; Frontier IP Law PLLC

(57) ABSTRACT

Disclosed is creation of a very narrow bandwidth part (BWP), referred to herein as a virtual BWP. The virtual BWP is created within an operating channel that is not supported by 3rd Generation Partnership Project (3GPP) current standards (e.g., below 5 MHz). This enables a wireless network to be even more flexible in supporting a variety of use cases. In particular, the network artificially creates a small virtual BWP and assigns it to users without requiring any explicit signaling to the user for creating the virtual BWP. The virtual BWPs will limit the physical downlink control channel (PDCCH), the physical downlink shared channel (PDSCH) data region, the physical uplink control channel (PUCCH) and the physical uplink shared channel (PUSCH) for a given user which can be associated with slicing.

12 Claims, 8 Drawing Sheets

(56) References Cited

OTHER PUBLICATIONS

RAN4 Chair (HUAWEI)et al: "New WI NR support for dedicated spectrum less than 5MHz for FRI", 3Gpp Draft RI-212722, 3Rd Generation Partnership Project (3GPP), Mobile Competence Center 650, Route Des Lucioles F-06921 Sophia-Antipolis Cedex France, vol. RAN WGI, No. e-Meeting; Dec. 6, 2021-Dec. 17, 2021, Oct. 31, 2021, XP052073207.
"PCT Search Report and Written Opinion, PCT/US2022/049026", Mar. 9, 2023, 15 pages.
Qualcomm Incorporated, "BW Reduction for RedCap UE", 3GPP TSG-RAN WG1 Meeting #106bis-e; e-Meeting; https://www.3gpp.org/ftp/tsg_ran/WG1_RL1/TSGR1_106b-e/Docs, Oct. 11-19, 2021, 29 pages.
RAN4 Chair (Huawei), "New WI: NR support for dedicated spectrum less than 5MHz for FR1", 3GPP TSG RAN Meeting #94e, RP-212722, Electronic Meeting, Dec. 6-17, 2021 (revision of RP-21xxxx); https://www.3gpp.org/ftp/isg_ran/TSG_RAN/TSGR_94e/Docs, Dec. 6-17, 2021.

* cited by examiner

SYSTEMS AND METHODS FOR VIRTUAL BANDWIDTH PARTS

TECHNICAL FIELD

The present disclosure relates to mobile wireless communication systems, and more particularly relates to mobile communication systems that use bandwidth parts.

BRIEF SUMMARY

Creation of a very narrow bandwidth part (BWP), referred to herein as a virtual BWP, is disclosed herein. The creation of the virtual BWP is within an operating channel that is not supported by 3rd Generation Partnership Project (3GPP) current standards (e.g., below 5 MHz). This enables a wireless cellular network to be even more flexible in supporting a variety of use cases. In particular, the network artificially creates a small virtual BWP and assigns it to users without requiring any explicit signaling to the user for creating the virtual BWP. The virtual BWPs will limit the physical downlink control channel (PDCCH) control, the physical downlink control channel (PDSCH) data region, the physical uplink control channel (PUCCH) and the physical uplink shared channel (PUSCH), for a given user which can be associated with slicing.

In one example embodiment, the system creates for user equipment (UE) a virtual BWP that has a bandwidth of less than 5 MHz and that comprises less than 25 physical resource blocks (PRBs). The virtual BWP enables the UE to operate within the bandwidth of the virtual BWP when the virtual BWP is active. In an example embodiment, the system restricts a PDCCH for the UE to be only within the bandwidth of the virtual BWP in response to the virtual BWP being active, restricts a PDSCH for the UE to be only within the bandwidth of the virtual BWP in response to the virtual BWP being active, restricts a PUCCH for the UE to be only within the bandwidth of the virtual BWP in response to the virtual BWP being active and restricts a PUSCH for the UE to be only within the bandwidth of the virtual BWP in response to the virtual BWP being active.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
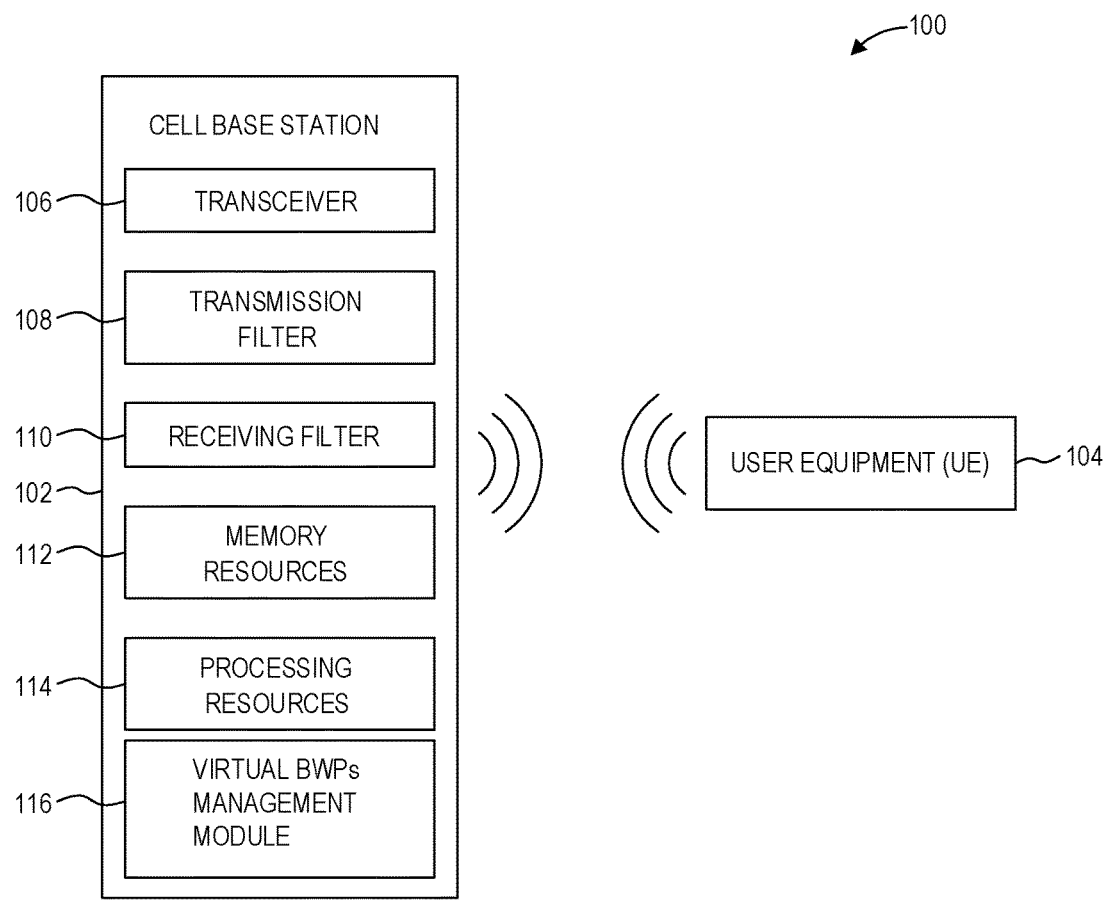
FIG. 1 is a block diagram of a wireless communication system, according to one embodiment.

FIG. 1 is a block diagram of a wireless communication system 100, according to one embodiment. The wireless communication system 100 includes a base station 102 and a user equipment (UE) 104. UE 104, for example, may be a cellular telephone, smartphone, tablet device, Internet of Things (IoT) device, other cellular-enabled device, etc. The base station 102 enables the UE 104 to communicate with other UEs or to send and receive data via the Internet.

The base station 102 includes a transceiver 106, a transmission filter 108, a receiving filter 110, memory resources 112, and processing resources 114. The transceiver 106 transmits mobile communication signals to the UE 104, to other base stations, and to other communication systems to enable mobile communication and access to the Internet. The memory resources 112 include one or more computer readable media that store software instructions for establishing a mobile communication network with the base station 102 and may also include software instructions that comprise virtual bandwidth parts (BWPs) management module 116 that implements or facilitates implementation of virtual BWPs as described herein. The processing resources 114 execute the instructions stored in one or more computer readable media of the memory resources 112. As set forth in more detail below, executing the software instructions, such as those of virtual BWPs management module 116, causes the base station 102 to implement virtual bandwidth parts 116.

In one embodiment, the communication system 100 is a 3GPP network. The communication system 100 can include a fifth generation (5G) new radio (NR) network. The communication system 100 can include other types of networks without departing from the scope of the present disclosure.

3GPP standards have defined specific bandwidths that can be utilized by 5G NR UE. In particular, UEs can utilize bandwidths of 5 MHz, 10 MHz, 15 MHz, 20 MHz, etc. 3GPP standards for 5G do not provide for UEs utilizing bandwidths that are below 5 MHz or that are not multiples of 5 MHz.

Organizations and companies that wish to provide wireless communication network services typically purchase the rights to a particular portion of wireless spectrum. For example, 3GPP standards define a large number of evolved universal mobile telecommunications system (E-UTRA) bands in the radio frequency spectrum. Wireless service providers can purchase, license, or otherwise acquire bandwidth within one or more of these bands and can then provide mobile communication services within that portion of the band.

The 5G NR wireless access technology, including, for example, that which may be implemented by sample cell base station 102 and UE 104, features flexibility to support a variety of usage scenarios. One of the basic concepts in 5G NR is bandwidth part (BWP), which is, at a high level, a set of contiguous resource blocks configured inside a channel bandwidth. In fourth generation long-term evolution (4G/ LTE) wireless technologies, UEs support the maximum possible bandwidth of 20 MHz. In 5G, transmission can go up to 400 MHz per carrier. It is impractical to expect every UE to support such a high bandwidth. Therefore, by design, it's possible for a 5G UE to communicate on a bandwidth smaller than the cell's channel bandwidth. This smaller portion is a BWP. Via Radio Resource Control (RRC) signaling, a UE (e.g., UE 104) is configured with multiple BWPs, in downlink (DL) and uplink (UL). At the 5G NR physical (PHY) layer, the network dynamically activates a BWP for transmission or reception. Through such dynamic adaptation, BWPs allow a 5G system, such as that shown in FIG. 1, to use radio resources optimally to suit current needs.

BWPs allow design of chipsets and UEs of a lower bandwidth capability. Mandating a UE to always use a high bandwidth also leads to higher energy usage. For example, when comparing 20 MHz of LTE versus 100 MHz Frequency Range 1 (FR1) of 5G, apart from the higher bandwidth, 5G's higher sub-carrier spacing translates to lower symbol duration, higher clock speeds and therefore higher power consumption. In 5G Frequency Range 2 (FR2) mmWave spectrum, power consumption increases further due to antenna arrays and other radio frequency (RF) components. At lower data rates, 5G at 100 MHz has a lower power efficiency compared to 4G. The use of BWPs overcomes this. Also, allocating a single bandwidth to a UE is also not the best use of radio resources, so BWPs allow for dynamic adaptation. A BWP is a contiguous set of Resource Blocks (RBs). It starts at a common resource block (RB) and spans a specified number of RBs. Numerology, which determines sub-carrier spacing and cyclic prefix, is also a BWP configuration. In one example allocation scenario, a reduced BWP is configured for a UE of a lower bandwidth capability. Another scenario is having two BWPs with different numerology, each meeting different service requirements. While Physical Resource Blocks (PRBs) of a BWP are all contiguous, there's no requirement that two BWPs have to be contiguous.

According to current 3GPP standards, a UE can be configured with a maximum of four BWPs in downlink and another four in uplink. This is in addition to the initial BWPs configured via System Information Block 1 (SIB1). Like UL, there's also Supplementary Uplink (SUL). UE can have four BWPs in SUL. Even with multiple configured BWPs, only one is active at any one time; that is, UE transmits and receives within its active BWP and nowhere else. Downlink (DL) PDSCH/PDCCH/channel state information reference signal (CSI-RS) are received only within the active DL BWP, but UE can use measurement gaps to perform measurements outside the active BWP. Uplink (UL) PUSCH/ PUCCH are sent by UE only with the active UL BWP. BWP switching means deactivating the currently active BWP and activating another configured BWP. In time division duplex (TDD), DL and UL BWPs differ only by the transmission bandwidth and numerology; and they're switched together. There is also a default BWP configured for DL and UL. If not configured, initial BWP is used as default. Default is used when there's not much to send or receive to or from the UE. It is activated when an inactivity timer expires.

A UE's access to the network starts with acquiring the Synchronization Signal Block (SSB) that consists of Primary Synchronization Signal (PSS), Secondary Synchronization Signal (SSS) and Physical Broadcast Channel (PBCH). This spans four Orthogonal Frequency Division Multiplexing (OFDM) symbols and 20 RBs, and contains the Master Information Block (MIB). MIB contains Control Resource Set (CORESET)#0 configuration. This is used by UE to infer the initial DL BWP. UE receives and decodes the CORESET #0, which contains SIB1. SIB1 sets the initial BWP for both DL and UL. Initial BWP is named BWP #0. DL BWP #0 is configured such that it encompasses CORESET #0.

Random Access Channel (RACH) access happens with UL BWP #0. Network responds with DL BWP #0 until RRC connection happens. Once RRC connection happens, UE can be configured with UE-specific BWPs. When a UE moves from idle mode to RRC connected mode, RRC signaling can configure UE-specific BWPs. The RRC configuration or reconfiguration message may specify one of these to be activated. If so, the UE will do BWP switching. Due to RRC processing delay, this can be in the order of tens of milliseconds. Once UE is configured with multiple BWPs, the network can command UE to switch BWP using Downlink Control Information (DCI) in PDCCH. DCI format 1_1 for downlink assignment and format 0_1 for uplink grant are used. These formats contain the BWP indicator that can take 1 or 2 bits. If more than 2 BWPs are configured, 2-bit indicator is used. The third way of switching is when BWP inactivity timer expires, which triggers a switch to default BWP. The timer ranges from 2-2560 ms.

CORESET is where the UE searches for downlink control signals. Like BWP, it's smaller than the carrier bandwidth. A CORESET can be anywhere, but a UE is expected to process only CORESETs that are within its active BWPs. CORESETs are configured at cell level so that the configuration can be reused for any applicable BWP. CORESET is where UE searches for PDCCH, though the network does not necessarily transmit PDCCH on every CORESET. Whereas in LTE, control region spans the entire carrier bandwidth, 5G NR optimizes this via CORESET. The LTE control region can vary and is specified by the Physical Control Format Indicator Channel (PCFICH). In 5G NR, CORESET size is configured via RRC signalling. CORESET spans up to three OFDM symbols. CORESET at the start of the slot facilitates scheduling decisions. CORESET at other places may be useful to reduce latency. In the frequency domain, CORESET is in multiple of six RBs. A BWP can have up to three CORESETs. CORESETs are common or UE specific. Configured via MIB, CORESET #0 is used for SIB1 scheduling. After RRC connection, UE-specific CORESETs may be configured.

However, the present disclosure discloses creation of a very narrow BWP, referred to herein as a virtual BWP, within an operating channel which is not supported by 3GPP current standards (e.g., below 5 MHz). This enables the wireless network, such as that shown in FIG. 1, to be even more flexible in supporting a variety of use cases. In particular, the network, including, for example, the cell base station 102 and UE 104, artificially creates a small virtual BWP and assign it to the users without requiring any explicit signaling to the user for creating the virtual BWP. The virtual BWPs will limit the PDCCH control, the PDSCH data region, the PUCCH and the PUSCH for a given user which can be associated with slicing.

Figure 2:
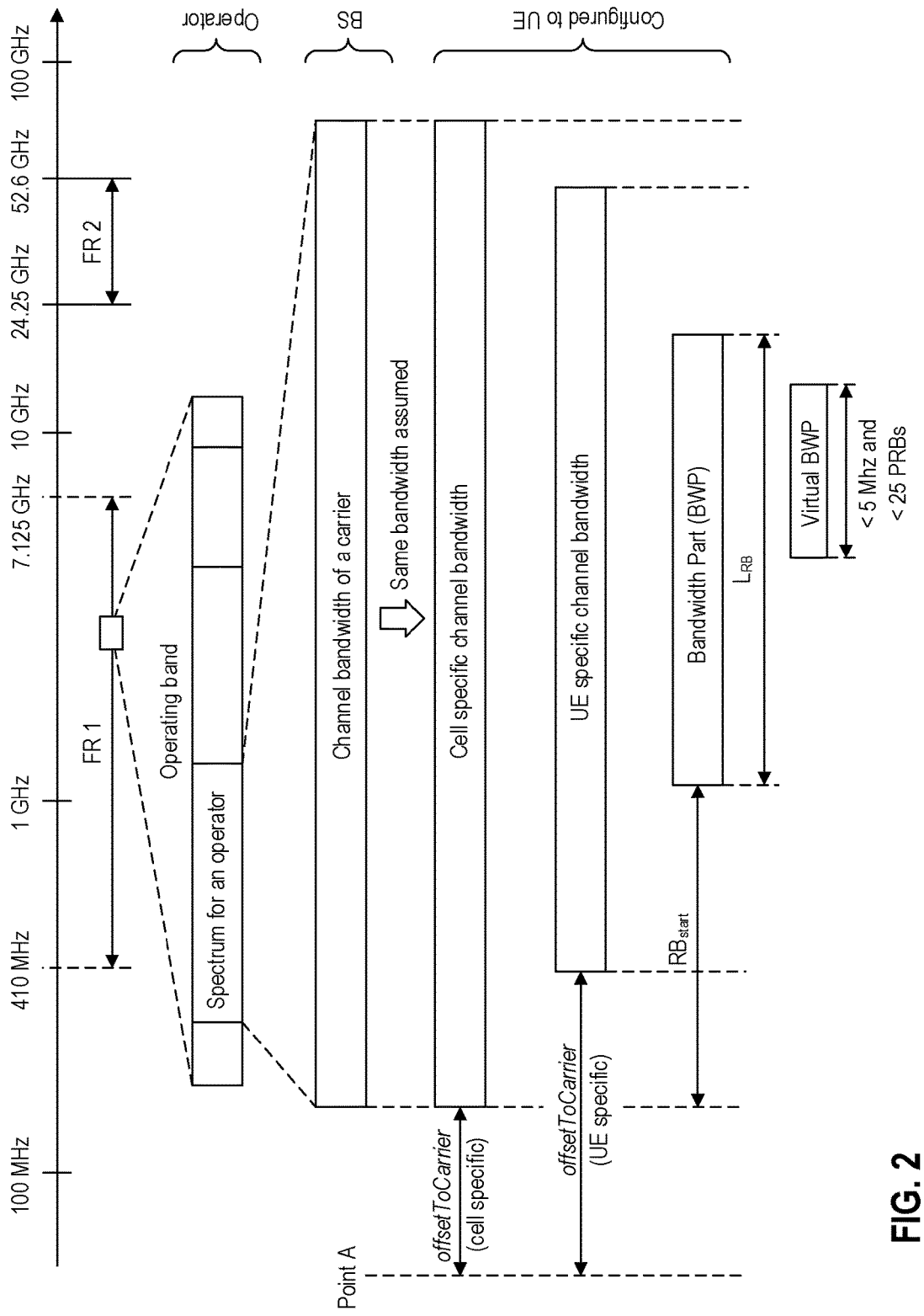
FIG. 2 is a representation of an example virtual bandwidth part within a channel bandwidth of a wireless services carrier, according to one embodiment.

FIG. 2 is a representation of an example virtual bandwidth part within a channel bandwidth of a wireless services carrier, according to one embodiment. NR defines scalable OFDM numerologies using subcarrier spacing (SCS) of $2^\mu \cdot 15$ kHz ($\mu=0, 1, \ldots, 4$). A resource block (RB) consists of 12 consecutive subcarriers in the frequency domain. NR uses "Point A" as a common reference point for RB grids as illustrated in FIG. 2.

As illustrated in FIG. 1, a BWP starts at a certain common RB and consists of a set of contiguous RBs with a given numerology (SCS and cyclic prefix) on a given carrier. For each serving cell of a UE, such as that provided by cell base station 102 of FIG. 2, the network configures at least one downlink (DL) BWP (i.e., the initial DL BWP). The network may configure the UE with up to four DL BWPs, but only one DL BWP can be active at a given time. If the serving cell is configured with an uplink (UL), the network configures at least one UL BWP. Similar to the DL, the network may configure the UE with up to four UL BWPs, but only one UL BWP can be active at a given time. NR also supports a so-called supplementary UL (SUL), on which UL BWP(s) can be similarly configured as on a normal UL.

For paired spectrum, i.e., frequency division duplex (FDD), DL BWPs and UL BWPs are configured separately. For unpaired spectrum, i.e., time division duplex (TDD), a DL BWP is linked to an UL BWP when the indices of the two BWPs are the same. In this case, the paired DL BWP and UL BWP must share the same center frequency, but they can have different bandwidths.

In general, a UE only receives PDSCH, PDCCH, or CSI-RS inside an active DL BWP. But the UE may need to perform radio resource management (RRM) measurements outside the active DL BWP via measurement gaps. Similarly, the UE PUSCH and PUCCH inside an active UL BWP and, for an active serving cell, the UE does not transmit sounding reference signal (SRS) outside an active UL BWP.

Shown in FIG. 2, according to an example embodiment, is an example operating band within FR1, an example spectrum for an operator within the operating band, an example channel bandwidth of a wireless carrier, e.g., that configured for base station 102 of FIG. 1, within the spectrum of the operator (which in the present case an example cell specific bandwidth is assumed to be the same bandwidth as the example channel bandwidth of the wireless carrier), an example UE specific channel bandwidth within the example cell specific bandwidth, a 5G NR BWP within the example UE specific channel bandwidth, and an example virtual bandwidth BWP within the bandwidth of the 5G NR BWP. As shown, the bandwidth of the virtual BWP is smaller than that which is supported by 3GPP current standards for 5G NR BWPs (e.g., below 5 MHz) and consists of less than 25 PRBs.

Figure 3:
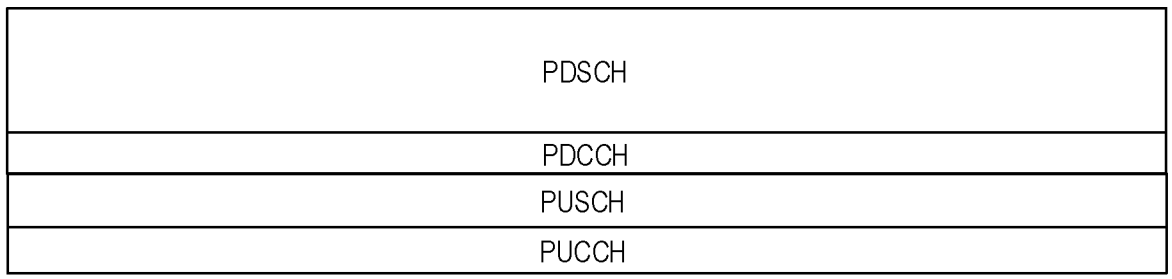
FIG. 3 is a representation of how the PDCCH, the PDSCH, the PUCCH and the PUSCH may be restricted to a virtual bandwidth part within a channel bandwidth of a wireless services carrier, according to one embodiment.
Figure 3:
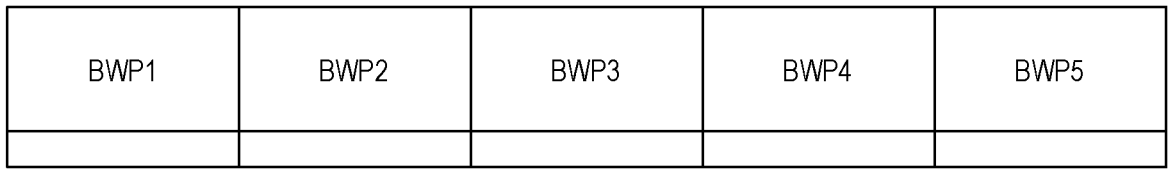

FIG. 3 is a representation of how the PDCCH, the PDSCH, the PUCCH and the PUSCH may be restricted to a virtual bandwidth part within a channel bandwidth of a wireless services carrier, according to one embodiment. Traditionally, the PDCCH, the PDSCH, the PUCCH and the PUSCH span the entire bandwidth (5 Mhz, 10 Mhz or 15 Mhz) of a 5G NR BWP supported by supported by 3GPP current standards. However, according to an embodiment, the virtual BWPs disclosed herein (e.g., BWP1, BWP2, BWP3, BWP4 and BWP5) restrict the PDCCH, the PDSCH, the PUCCH and the PUSCH for the UE to be only within the bandwidth of the virtual BWP in response to the virtual BWP being active.

As shown in FIG. 3, the PDCCH, the PDSCH, the PUCCH and the PUSCH for virtual BWP1 is restricted to be within the bandwidth of virtual BWP1; the PDCCH, the PDSCH, the PUCCH and the PUSCH for virtual BWP2 is restricted to be within the bandwidth of virtual BWP2; the PDCCH, the PDSCH, the PUCCH and the PUSCH for virtual BWP3 is restricted to be within the bandwidth of virtual BWP3; the PDCCH, the PDSCH, the PUCCH and the PUSCH for BWP4 is restricted to be within the bandwidth of virtual BWP4; and the PDCCH, the PDSCH, the PUCCH and the PUSCH for BWP5 is restricted to be within the bandwidth of virtual BWP5. For example, the bandwidth of BWP1 may be less than 5 Mhz and consist of less than 25 PRBs (down to a minimum of only 1 PRB) and the PDCCH, the PDSCH, the PUCCH and the PUSCH will be restricted to that bandwidth, such as via PRB scheduling in the 5G NR wireless network. This may be implemented, for example, by setting and utilizing a value of a parameter defining the frequency domain width for carrying PDCCH, the PDSCH, the PUCCH and/or the PUSCH. In one embodiment, the cellular network comprising cell base station 102, utilizing virtual BWPs management module 116 will ensure that the UE stays within its assigned virtual BWP and no explicit signaling will be required.

Figure 4:
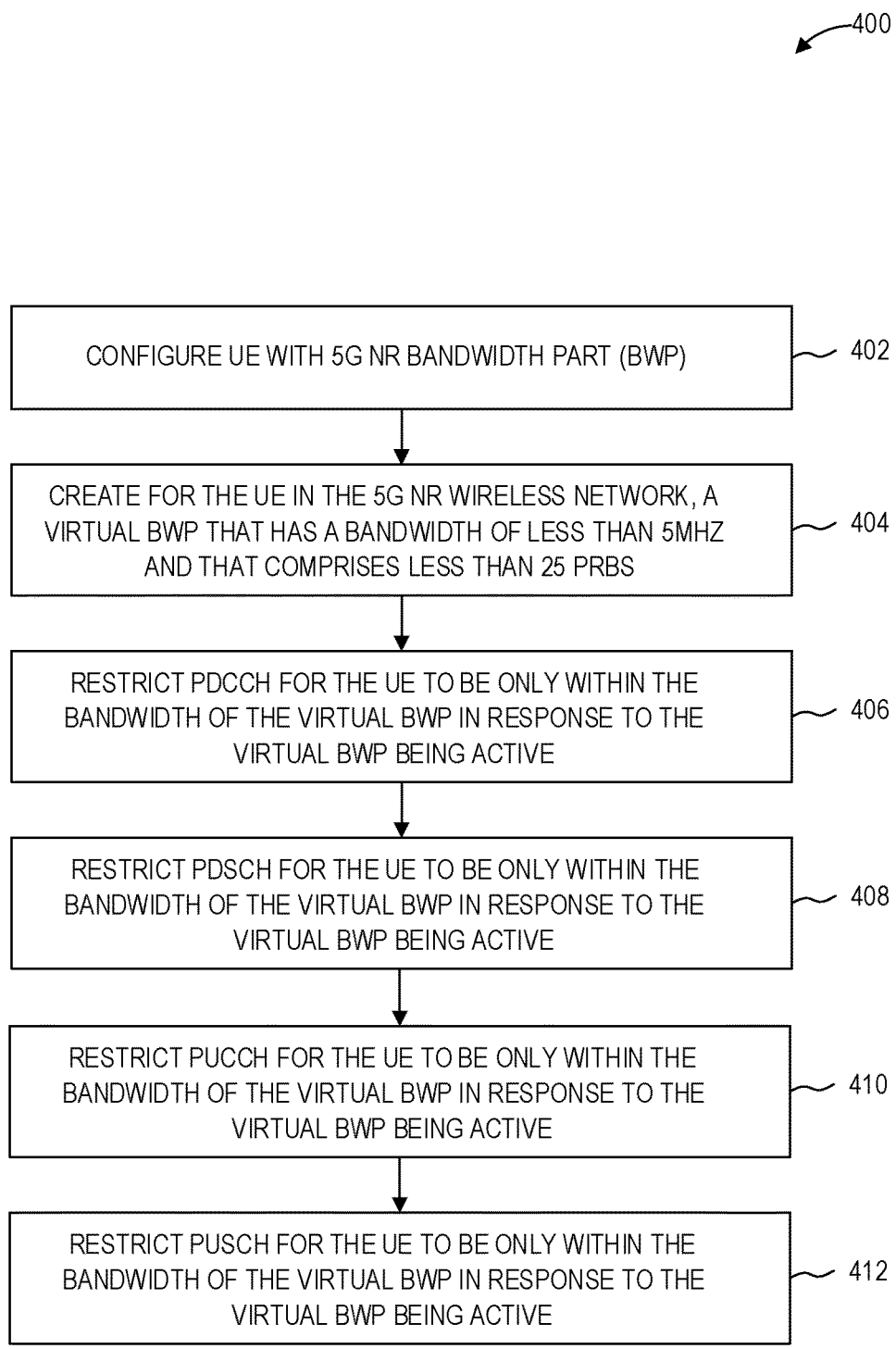
FIG. 4 is a flow diagram of a method for implementing a virtual bandwidth part, according to one embodiment.

FIG. 4 is a flow diagram of a method 400 for implementing a virtual bandwidth part, according to one embodiment.

At 402, the system 100 configures, via radio resource control (RRC) signaling, UE with a 5G NR wireless network BWP. The BWP is a contiguous set of physical resource blocks (PRBs) from a contiguous subset of common resource blocks on a wireless carrier channel. The 5G NR BWP has a bandwidth that is at least 5 MHz and comprises at least 25 physical resource blocks (PRBs) and the BWP enables the UE to operate, when the BWP is active, within the bandwidth of the BWP that is narrower than a bandwidth of the wireless carrier channel. At 404, the system 100 creates for the UE, via PRB scheduling in the 5G NR wireless network, a virtual BWP that has a bandwidth of less than 5 MHz and that comprises less than 25 PRBs. The virtual BWP enables the UE to operate within the bandwidth of the virtual BWP when the virtual BWP is active. In one embodiment, the system 100 enables selection of how many PRBs will comprise the virtual BWP, wherein a particular number of PRBs that will comprise the virtual BWP is selectable from one PRB to 24 PRBs.

At 406, the system 100 restricts a PDCCH for the UE to be only within the bandwidth of the virtual BWP in response to the virtual BWP being active.

At 408, the system 100 restricts a PDSCH for the UE to be only within the bandwidth of the virtual BWP in response to the virtual BWP being active.

At 410, the system 100 restricts a PUCCH for the UE to be only within the bandwidth of the virtual BWP in response to the virtual BWP being active.

At 412, the system 100 restricts a PUSCH for the UE to be only within the bandwidth of the virtual BWP in response to the virtual BWP being active.

Figure 5:
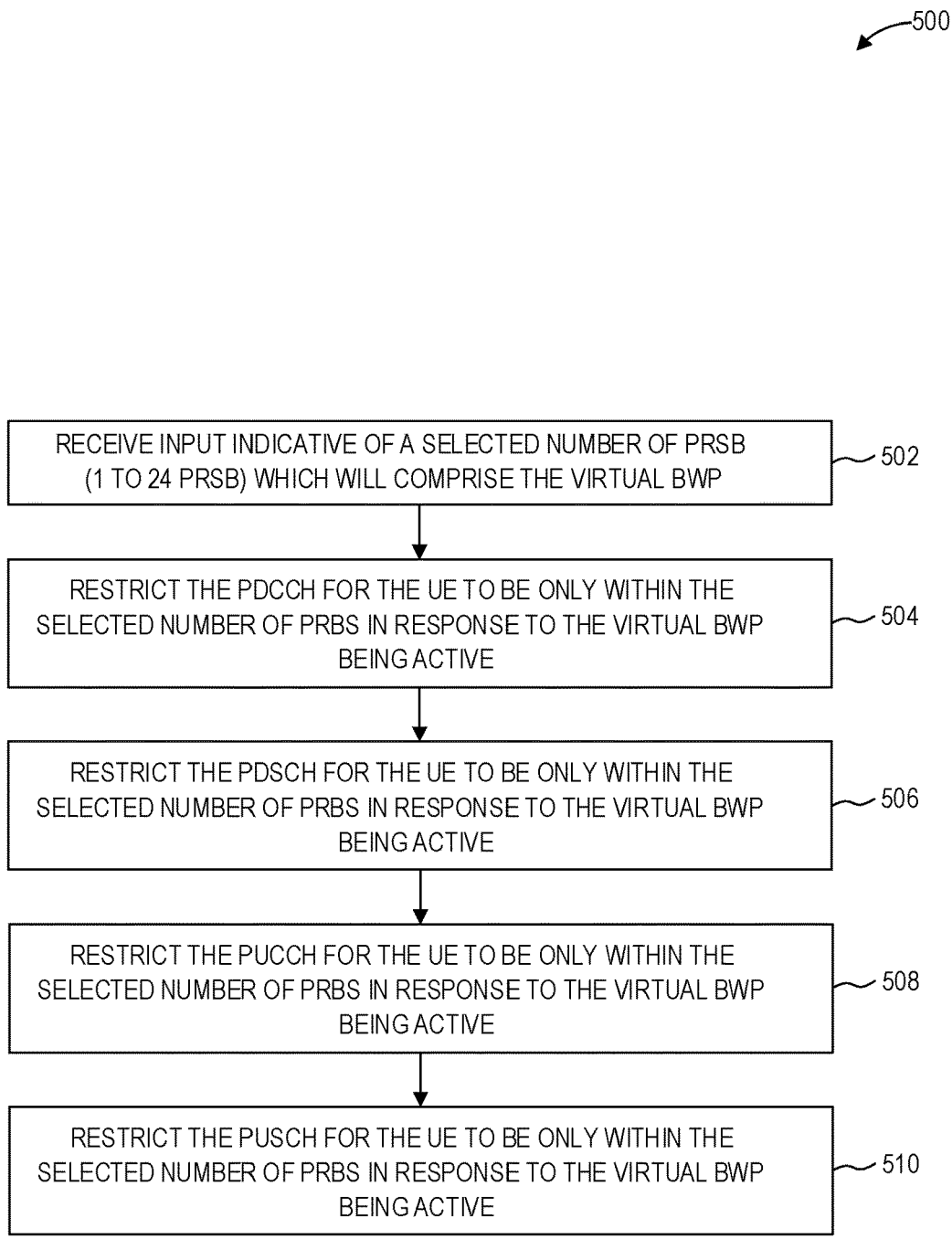
FIG. 5 is a flow diagram of a method for implementing a virtual bandwidth part involving a selected number of PRBs, according to one embodiment.

FIG. 5 is a flow diagram of a method 500 for implementing a virtual bandwidth part involving a selected number of PRBs, according to one embodiment.

At 502, the system 100 receives input indicative of a selected number of PRBs which will comprise the virtual BWP. The selected number of PRBs which will comprise the virtual BWP falls within a range of one PRB to 24 PRBs.

At 504, the system 100 restricts the PDCCH for the UE to be only within the selected number of PRBs in response to the virtual BWP being active.

At 506, the system 100 restricts the PDSCH for the UE to be only within the selected number of PRBs in response to the virtual BWP being active.

At 508, the system 100 restricts the PUCCH for the UE to be only within the selected number of PRBs in response to the virtual BWP being active.

At 510, the system 100 restricts the PUSCH for the UE to be only within the selected number of PRBs in response to the virtual BWP being active. For example, in various embodiments, the system 100 restricts PRB scheduling for the UE to the selected number of PRBs for the virtual BWP in response to the virtual BWP being activated.

Figure 6:
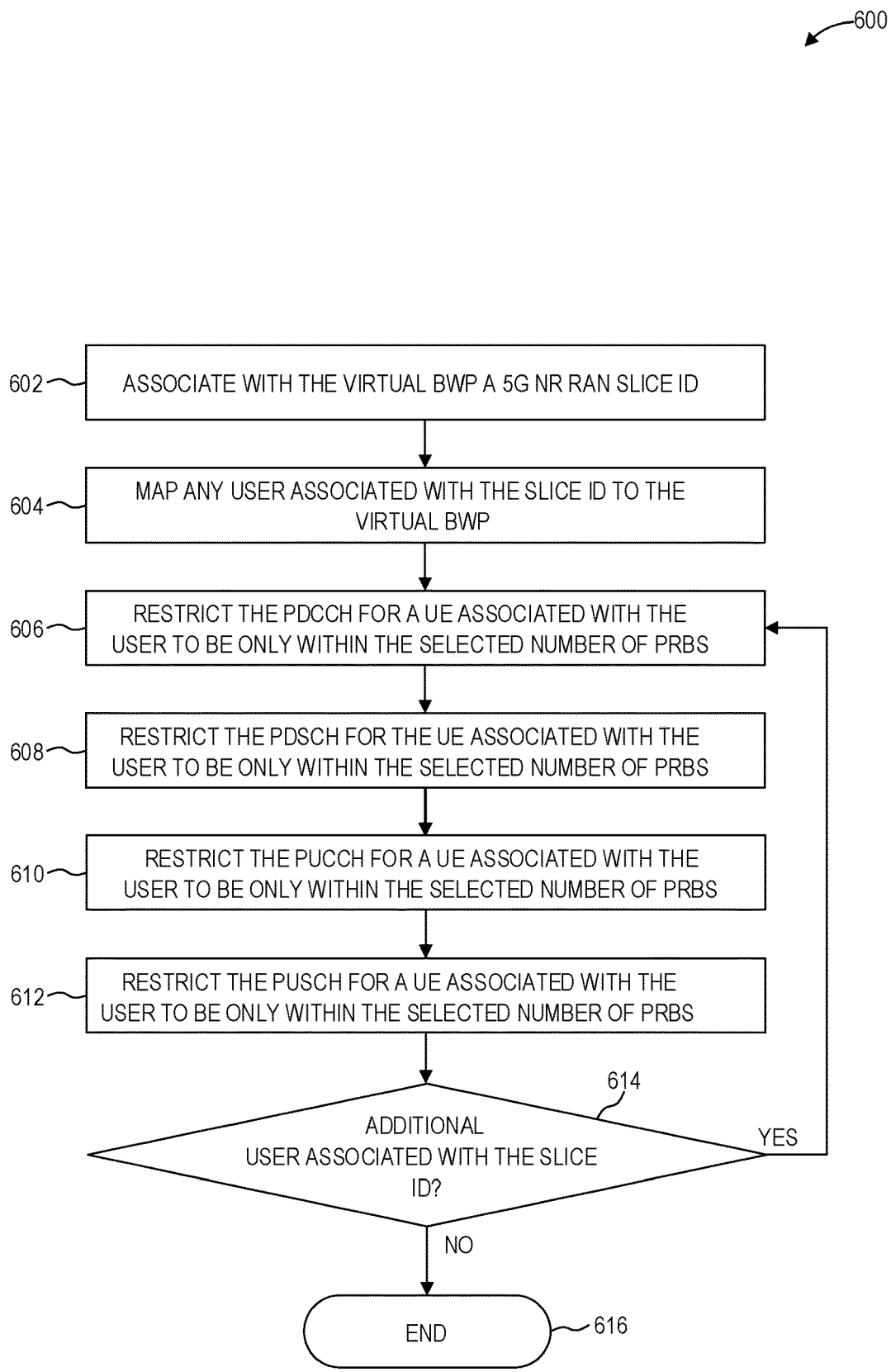
FIG. 6 is a flow diagram of a method for implementing a virtual bandwidth for each user associated with a slice ID, according to one embodiment.

FIG. 6 is a flow diagram of a method 600 for implementing a virtual bandwidth for each user associated with a slice ID, according to one embodiment.

At 602, the system 100 associates with the virtual BWP a 5G NR radio access network (RAN) slice ID.

At 604, the system 100 maps any user associated with the slice ID to the virtual BWP.

At 606, the system 100 restricts the PDCCH for a UE associated with a user associated with the slice ID to be only within the selected number of PRBs when the virtual BWP is active for the UE associated with the user.

At 608, the system 100 restricts the PDSCH for the UE associated with the user to be only within the selected number of PRBs when the virtual BWP is active for the UE associated with the user.

At 610, the system 100 restricts the PUCCH for a UE associated with a user associated with the slice ID to be only within the selected number of PRBs when the virtual BWP is active for the UE associated with the user.

At 612, the system 100 restricts the PUSCH for the UE associated with the user to be only within the selected number of PRBs when the virtual BWP is active for the UE associated with the user.

At 614, the system 100 determines whether there are additional users associated with the slice ID. If the system 100 determines there are additional users associated with the slice ID, then the method 600 proceeds back to 606. If the system 100 determines there are not additional users associated with the slice ID, then the method 600 proceeds back to 606.

At 616, the method 600 ends.

Figure 7:
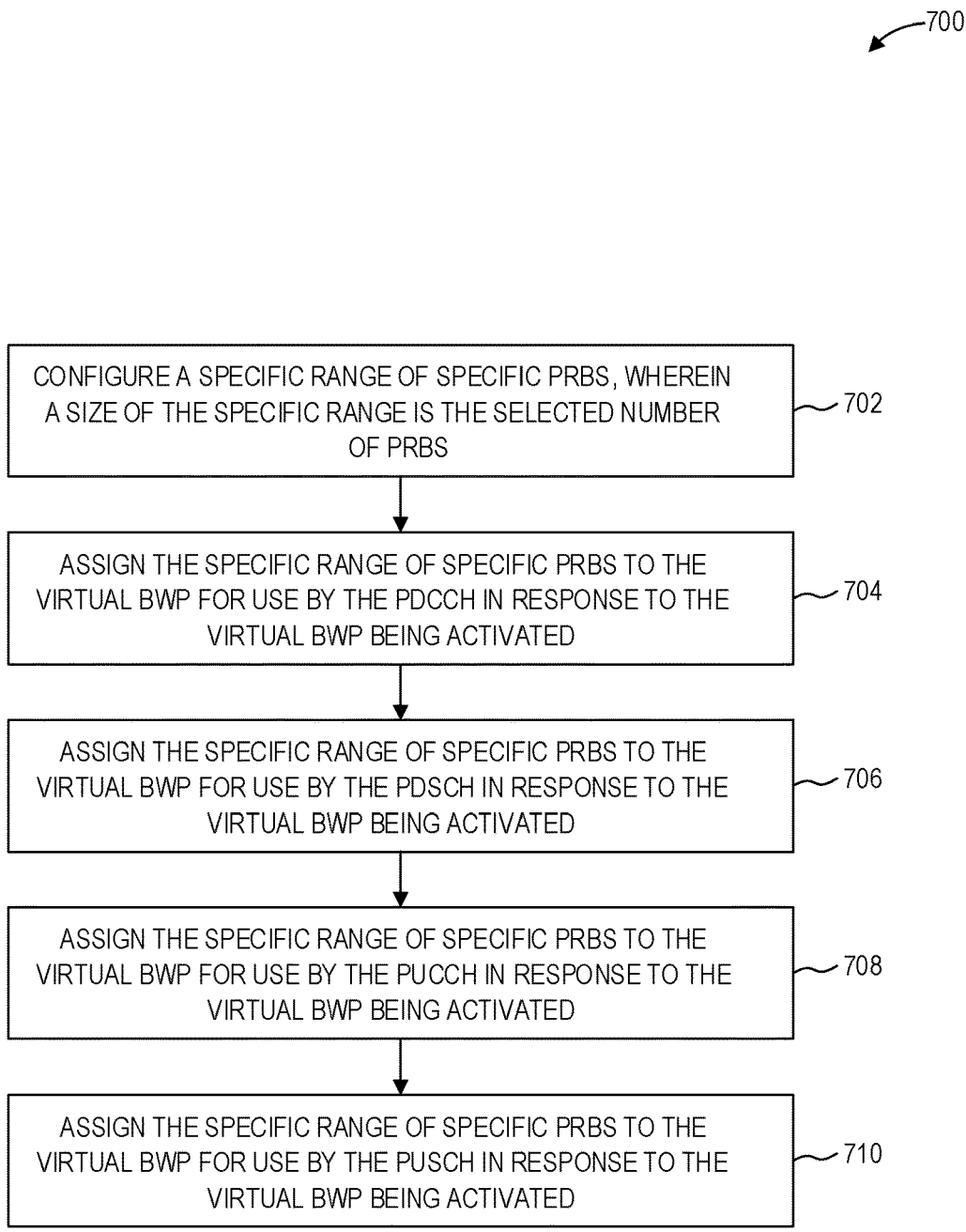
FIG. 7 is a flow diagram of a method for implementing a virtual bandwidth involving assigning the specific range of specific PRBs to the virtual BWP.

FIG. 7 is a flow diagram of a method 700 for implementing a virtual bandwidth involving assigning the specific range of specific PRBs to the virtual BWP. In one embodiment, the system 100 restricts PRB scheduling for the UE to the selected number of PRBs for the virtual BWP in response to the virtual BWP being activated.

At 702, the system 100 configures a specific range of specific PRBs. For example, the size of the specific range may be the selected number of PRBs selected in the method 500 of FIG. 5 (e.g., the selected number of PRBs for the virtual BWP may be 10 PRBs).

At 704, the system 100 assigns the specific range of specific PRBs to the virtual BWP for use by the PDCCH in response to the virtual BWP being activated.

At 706, the system 100 assigns the specific range of specific PRBs to the virtual BWP for use by the PDSCH in response to the virtual BWP being activated.

At 708, the system 100 assigns the specific range of specific PRBs to the virtual BWP for use by the PUCCH in response to the virtual BWP being activated.

At 710, the system 100 assigns the specific range of specific PRBs to the virtual BWP for use by the PUSCH in response to the virtual BWP being activated.

Figure 8:
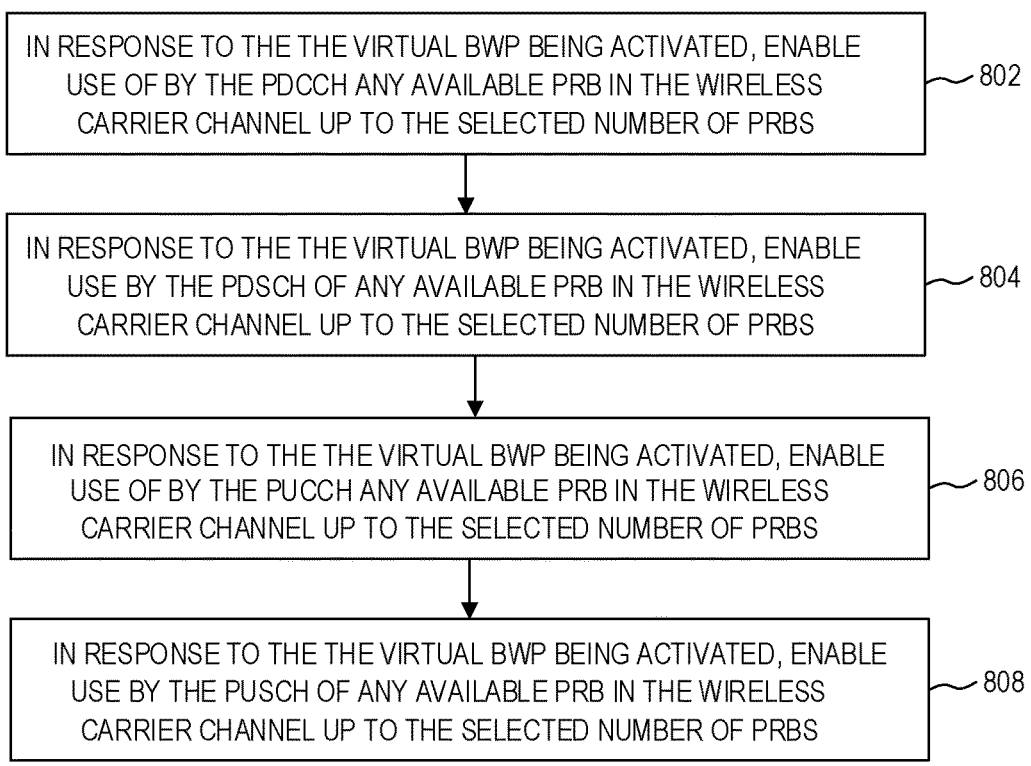
FIG. 8 is a flow diagram of a method for implementing a virtual bandwidth involving dynamically assigning PRBs to the virtual BWP.

FIG. 8 is a flow diagram of a method 800 for implementing a virtual bandwidth involving dynamically assigning PRBs to the virtual BWP. In one embodiment, the system 100 restricts PRB scheduling for the UE to the selected number of PRBs for the virtual BWP in response to the virtual BWP being activated.

At 802, the system 100, in response to the virtual BWP being activated, enables use by the PDCCH of any available PRB in the wireless carrier channel up to the selected number of PRBs. For example, the selected number of PRBs may be the selected number of PRBs selected in the method 500 of FIG. 5 (e.g., the selected number of PRBs for the virtual BWP may be 10 PRBs).

At 804, the system 100, in response to the virtual BWP being activated, enables use by the PDSCH of any available PRB in the wireless carrier channel up to the selected number of PRBs.

At 806, the system 100, in response to the virtual BWP being activated, enables use by the PUCCH of any available PRB in the wireless carrier channel up to the selected number of PRBs.

At 808, the system 100, in response to the virtual BWP being activated, enables use by the PUSCH of any available PRB in the wireless carrier channel up to the selected number of PRBs.

The embodiments described above may use synchronous or asynchronous client-server computing techniques. However, one or more of the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of system components described herein may be available by mechanisms such as through C, C++, C#, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
configuring, via radio resource control (RRC) signaling, a user equipment (UE) with a fifth generation (5G) New radio (NR) wireless network bandwidth part (BWP) that is a contiguous set of physical resource blocks (PRBs) from a contiguous subset of common resource blocks on a wireless carrier channel, wherein the BWP has a bandwidth that is at least 5 MHz and comprises at least 25 physical resource blocks (PRBs) and the BWP enables the UE to operate, when the BWP is active, within the bandwidth of the BWP that is narrower than a bandwidth of the wireless carrier channel;
creating for the UE, via PRB scheduling in the 5G NR wireless network, a virtual BWP that has a bandwidth of less than 5 MHz and that comprises less than 25 PRBs, wherein the virtual BWP enables the UE to operate within the bandwidth of the virtual BWP when the virtual BWP is active;
restricting a physical downlink control channel (PDCCH) for the UE to be only within the bandwidth of the virtual BWP in response to the virtual BWP being active;
restricting a physical downlink shared channel (PDSCH) for the UE to be only within the bandwidth of the virtual BWP in response to the virtual BWP being active;
restricting a physical uplink control channel (PUCCH) for the UE to be only within the bandwidth of the virtual BWP in response to the virtual BWP being active;
restricting a physical uplink shared channel (PUSCH) for the UE to be only within the bandwidth of the virtual BWP in response to the virtual BWP being active;
enabling selection of how many PRBs will comprise the virtual BWP, wherein a particular number of PRBs that will comprise the virtual BWP is selectable from one PRB to 24 PRBs;
receiving input indicative of a selected number of PRBs which will comprise the virtual BWP, wherein the selected number of PRBs which will comprise the virtual BWP falls within a range of one PRB to 24 PRBs;
restricting the PDCCH for the UE to be only within the selected number of PRBs in response to the virtual BWP being active;
restricting the PDSCH for the UE to be only within the selected number of PRBs in response to the virtual BWP being active;
restricting the PUCCH for the UE to be only within the selected number of PRBs in response to the virtual BWP being active; and
restricting the PUSCH for the UE to be only within the selected number of PRBs in response to the virtual BWP being active;
associating with the virtual BWP a 5G NR radio access network (RAN) slice ID;
mapping any user associated with the slice ID to the virtual BWP; and
for each user of a plurality of users associated with the slice ID:
restricting the PDCCH for a UE associated with the user to be only within the selected number of PRBs when the virtual BWP is active for the UE associated with the user:
restricting the PDSCH for the UE associated with the user to be only within the selected number of PRBs when the virtual BWP is active for the UE associated with the user:
restricting the PUCCH for a UE associated with the user to be only within the selected number of PRBs when the virtual BWP is active for the UE associated with the user; and
restricting the PUSCH for the UE associated with the user to be only within the selected number of PRBs when the virtual BWP is active for the UE associated with the user.

2. The method of claim 1, further comprising:
restricting PRB scheduling for the UE to the selected number of PRBs for the virtual BWP in response to the virtual BWP being activated.

3. The method of claim 2 wherein the restricting the PRB scheduling includes:
configuring a specific range of specific PRBs, wherein a size of the specific range is the selected number of PRBs;
assigning the specific range of specific PRBs to the virtual BWP for use by the PDCCH in response to the virtual BWP being activated; and
assigning the specific range of specific PRBs to the virtual BWP for use by the PDSCH in response to the virtual BWP being activated;
assigning the specific range of specific PRBs to the virtual BWP for use by the PUCCH in response to the virtual BWP being activated; and
assigning the specific range of specific PRBs to the virtual BWP for use by the PUSCH in response to the virtual BWP being activated.

4. The method of claim 2 wherein the restricting the PRB scheduling includes:

in response to the virtual BWP being activated, enabling use by the PDCCH of any available PRB in the wireless carrier channel up to the selected number of PRBs;

in response to the virtual BWP being activated, enabling use by the PDSCH of any available PRB in the wireless carrier channel up to the selected number of PRBs;

in response to the virtual BWP being activated, enabling use by the PUCCH of any available PRB in the wireless carrier channel up to the selected number of PRBs; and in response to the virtual BWP being activated, enabling use by the PUSCH of any available PRB in the wireless carrier channel up to the selected number of PRBs.

5. The method of claim 2 wherein the selected number of PRBs for the virtual BWP is 10 PRBs.

6. A system comprising:
at least one processor; and
a memory coupled to the at least one processor, the memory storing instructions that, when executed by the at least one processor, cause the system to perform operations including:
configuring, via radio resource control (RRC) signaling, a user equipment (UE) with a fifth generation (5G) New radio (NR) wireless network bandwidth part (BWP) that is a contiguous set of physical resource blocks (PRBs) from a contiguous subset of common resource blocks on a wireless carrier channel, wherein the BWP has a bandwidth that is at least 5 MHz and comprises at least 25 physical resource blocks (PRBs) and the BWP enables the UE to operate, when the BWP is active, within the bandwidth of the BWP that is narrower than a bandwidth of the wireless carrier channel;
creating for the UE, via PRB scheduling in the 5G NR wireless network, a virtual BWP that has a bandwidth of less than 5 MHz and that comprises less than 25 PRBs, wherein the virtual BWP enables the UE to operate within the bandwidth of the virtual BWP when the virtual BWP is active;
restricting a physical downlink control channel (PDCCH) for the UE to be only within the bandwidth of the virtual BWP in response to the virtual BWP being active;
restricting a physical downlink shared channel (PDSCH) for the UE to be only within the bandwidth of the virtual BWP in response to the virtual BWP being active;
enabling selection of how many PRBs will comprise the virtual BWP, wherein a particular number of PRBs that will comprise the virtual BWP is selectable from one PRB to 24 PRBs:
receiving input indicative of a selected number of PRBs which will comprise the virtual BWP, wherein the selected number of PRBs which will comprise the virtual BWP falls within a range of one PRB to 24 PRBs;
restricting the PDCCH for the UE to be only within the selected number of PRBs in response to the virtual BWP being active;
restricting the PDSCH for the UE to be only within the selected number of PRBs in response to the virtual BWP being active:
associating with the virtual BWP a 5G NR radio access network (RAN) slice ID;
mapping any user associated with the slice ID to the virtual BWP; and
for each user of a plurality of users associated with the slice ID:
restricting the PDCCH for a UE associated with the user to be only within the selected number of PRBs when the virtual BWP is active for the UE associated with the user; and
restricting the PDSCH for the UE associated with the user to be only within the selected number of PRBs when the virtual BWP is active for the UE associated with the user.

7. The system of claim 6, wherein the operations further comprise:
restricting PRB scheduling for the UE to the selected number of PRBs for the virtual BWP in response to the virtual BWP being activated.

8. The system of claim 7 wherein the restricting the PRB scheduling includes:
configuring a specific range of specific PRBs, wherein a size of the specific range is the selected number of PRBs;
assigning the specific range of specific PRBs to the virtual BWP for use by the PDCCH in response to the virtual BWP being activated; and
assigning the specific range of specific PRBs to the virtual BWP for use by the PDSCH in response to the virtual BWP being activated.

9. The system of claim 7 wherein the restricting the PRB scheduling includes:
in response to the virtual BWP being activated, enabling use by the PDCCH of any available PRB in the wireless carrier channel up to the selected number of PRBs; and
in response to the virtual BWP being activated, enabling use by the PDSCH of any available PRB in the wireless carrier channel up to the selected number of PRBs.

10. The system of claim 7 wherein the selected number of PRBs for the virtual BWP is 10 PRBs.

11. A non-transitory computer-readable storage medium having computer-executable instructions stored thereon that, when executed by at least one processor, cause a system to perform operations including:
configuring, via radio resource control (RRC) signaling, a user equipment (UE) with a fifth generation (5G) New radio (NR) wireless network bandwidth part (BWP) that is a contiguous set of physical resource blocks (PRBs) from a contiguous subset of common resource blocks on a wireless carrier channel, wherein the BWP has a bandwidth that is at least 5 MHz and comprises at least 25 physical resource blocks (PRBs) and the BWP enables the UE to operate, when the BWP is active, within the bandwidth of the BWP that is narrower than a bandwidth of the wireless carrier channel;
creating for the UE, via PRB scheduling in the 5G NR wireless network, a virtual BWP that has a bandwidth of less than 5 MHz and that comprises less than 25 PRBs, wherein the virtual BWP enables the UE to operate within the bandwidth of the virtual BWP when the virtual BWP is active;
restricting a physical downlink control channel (PDCCH) for the UE to be only within the bandwidth of the virtual BWP in response to the virtual BWP being active;
restricting a physical downlink shared channel (PDSCH) for the UE to be only within the bandwidth of the virtual BWP in response to the virtual BWP being active;
enabling selection of how many PRBs will comprise the virtual BWP, wherein a particular number of PRBs that will comprise the virtual BWP is selectable from one PRB to 24 PRBs;

receiving input indicative of a selected number of PRBs which will comprise the virtual BWP, wherein the selected number of PRBs which will comprise the virtual BWP falls within a range of one PRB to 24 PRBs;

restricting the PDCCH for the UE to be only within the selected number of PRBs in response to the virtual BWP being active:

restricting the PDSCH for the UE to be only within the selected number of PRBs in response to the virtual BWP being active:

associating with the virtual BWP a 5G NR radio access network (RAN) slice ID;

mapping any user associated with the slice ID to the virtual BWP; and for each user of a plurality of users associated with the slice ID:

restricting the PDCCH for a UE associated with the user to be only within the selected number of PRBs when the virtual BWP is active for the UE associated with the user; and restricting the PDSCH for the UE associated with the user to be only within the selected number of PRBs when the virtual BWP is active for the UE associated with the user.

12. The non-transitory computer-readable storage medium of claim 11, wherein the operations further comprise:

enabling selection of how many PRBs will comprise the virtual BWP, wherein a particular number of PRBs that will comprise the virtual BWP is selectable from one PRB to 24 PRBs.

\* \* \* \* \*